(12) United States Patent
Hurst-Hiller et al.

(10) Patent No.: US 7,346,613 B2
(45) Date of Patent: Mar. 18, 2008

(54) SYSTEM AND METHOD FOR A UNIFIED AND BLENDED SEARCH

(75) Inventors: Oliver Hurst-Hiller, Seattle, WA (US);
Eric B. Watson, Redmond, WA (US);
Eddie L. Mays, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 10/765,819

(22) Filed: Jan. 26, 2004

(65) Prior Publication Data

US 2005/0165777 A1 Jul. 28, 2005

(51) Int. Cl.
*G06F 7/00* (2006.01)
(52) U.S. Cl. .............................................. 707/4; 707/5
(58) Field of Classification Search .............. 707/1–10, 707/101, 100
See application file for complete search history.

(56) References Cited

U.S. PATENT DOCUMENTS

| | | |
|---|---|---|
| 6,195,654 B1 | 2/2001 | Wachtel |
| 6,370,527 B1 | 4/2002 | Singhal |
| 6,564,210 B1 | 5/2003 | Korda et al. |
| 2002/0152190 A1 | 10/2002 | Biebesheimer et al. |
| 2002/0169764 A1* | 11/2002 | Kincaid et al. ................. 707/3 |
| 2004/0177069 A1* | 9/2004 | Li et al. ......................... 707/5 |
| 2004/0267717 A1* | 12/2004 | Slackman ....................... 707/3 |

FOREIGN PATENT DOCUMENTS

| | | |
|---|---|---|
| WO | WO 98/12881 A2 | 3/1998 |
| WO | WO 01/25947 A1 | 4/2001 |
| WO | WO 01/75676 A2 | 10/2001 |
| WO | WO 02/41178 A1 | 5/2002 |

OTHER PUBLICATIONS

Church, G.M., "The Human-Computer Interface and Information Literacy: Some Basics and Beyond," *Information Technology and Libraries* 18(1):Mar. 3-21, 1999.
Drori, O. and N. Alon, "Using Document Classification for Displaying Search Results List," *Journal of Information Science* 29(2):97-106, 2003.
Hollis, R. and B.S. Brunelle, "Developing a Common User Interface for Information Searching," *Electronic Library* 13(4):283-286, Aug. 1995.
Savage-Knepshield, P.A., and N.J. Belkin, "Interaction in Information Retrieval: Trends Over Time," *Journal of the American Society for Information Services* 50(12):1067-1082, Oct. 1999.
Sutcliffe, A.G., et al., "Evaluating the Effectiveness of Visual User Interfaces for Information Retrieval," *International Journal of Human-Computer Studies* 53(5):741-763, Nov. 2000.
Thelwall, M., et al., "Custom Interfaces for Advanced Queries in Search Engines," *Aslib Proceedings-New Information Perspectives* 53(10):413-422, Nov.-Dec. 2001.
Liu, X., et al., "Federated Searching Interface Techniques for Heterogeneous OAI Repositories," *Journal of Digital Information* 2(4), 2002.

* cited by examiner

*Primary Examiner*—Wilson Lee
(74) *Attorney, Agent, or Firm*—Christensen O'Connor Johnson Kindness PLLC (57) ABSTRACT

A system, method, and computer-accessible medium for a unified search of disparate resources are provided. The system and method determine the most relevant disparate resources in which to search and blend the most relevant results from the search for presentation to the user in an integrated manner.

12 Claims, 8 Drawing Sheets

SYSTEM AND METHOD FOR A UNIFIED AND BLENDED SEARCH

FIELD OF THE INVENTION

In general, the present invention relates to computer software and search engines and, in particular, to systems and methods for facilitating searches for content from disparate resources.

BACKGROUND OF THE INVENTION

The widespread proliferation of content in digital form has presented new opportunities to search for information in a variety of contexts. Besides the ubiquitous Internet search engine, there are other commonplace search tools available to the user. For example, an e-mail application might provide a user with a tool to search for information appearing in a subject heading or in the body of e-mails that the user has sent or received. In a word processing application, a user might use a tool to search for words in the title or body of the documents that the user has created, or to which the user has access. Other kinds of searches might include image searches using metadata associated with the image.

Learning how to use these various search tools can be confusing for the user. For one thing, existing search tools are designed to search specific resources of data under the assumption that the user has already identified a specific resource in which to look—an assumption that is not necessarily true for many users. Knowing where to look can be especially difficult for the user nowadays, as computers are increasingly linked to other computers using the Internet or other types of network. The sheer volume of potential places to look, as well as the amount of data to search once you get there, make it important to search as efficiently as possible. Determining where to look, as well as sorting out which search results are most relevant, can be a daunting task. Furthermore, the determination of the best place to look or the most relevant result may change rapidly, making it difficult to keep searches both relevant and efficient.

Another problem with existing search tools is that each search tool has a different interface that the user must learn in order to find what he or she is looking for. For example, the Search command under the Windows XP™ operating system invokes a "search companion" to guide a user through a search in a manner that is completely different from the Search command under the Microsoft Word® word processing program, which prompts the user with a tabbed search dialog box.

There have been previous efforts to simplify searches for users, but those efforts have fallen short of meeting users' needs. For example, in the Internet search engine context, Web sites that allow users to type a search term in once and then simultaneously invoke several different search engines were once popular. But such Web sites provide no further assistance to the user to effectively search the most relevant content or to sort out the most relevant results from the various searches. Indeed, such Web sites potentially complicate the task for the user as more results are returned than when using a single search engine.

SUMMARY OF THE INVENTION

To overcome the above-described problems, a system, method, and computer-accessible medium for a unified search are provided. The system and method facilitate a unified search of disparate resources and blending the most relevant results from the search for presentation to the user in an integrated manner.

In accordance with one aspect of the present invention, a user navigates to a unified search entry interface and enters a query. The unified search process captures the navigational context of the query and determines the most relevant resources in which to search based not only on the content of the query, i.e., the search term, but also on one or more of the navigational contexts leading up to the entry of the query, i.e., the search entry point, the user's preferences, and any automated measurements of the relevance of potential resources, as gathered over time.

The user's preferences may be explicitly predefined by the user or implicitly determined based on past user behavior, and may include a privacy or security preference for designating which resources should never be searched or which resources may be trusted, irrespective of their determined relevance.

The automated measurements of relevance comprise usage data that reflects how users have interacted with resources in a local and/or non-local context, and thus their potential relevance to a particular search query. The resources include various databases and other data repositories containing searchable content, as well as the content itself. The usage data includes such data as the frequency with which a resource is accessed, the length of time the resource was accessed, what a user did with the resource after access, e.g., opened, retrieved, browsed, edited, sent, copied, saved, created, transacted a purchase, etc. The local usage data represents the local user's interactions with a resource, whereas the non-local usage data represents an aggregation of many users' interactions with the resource.

In accordance with another aspect of the present invention, determining the most relevant resources in which to search may include determining when to federate a search to additional resources that ordinarily would not be searched because they are either too expensive or time-consuming to search, e.g., remote computers accessible over a virtual private network, corporate networks, large databases, or proprietary databases available for a fee. In one aspect of the present invention, determining whether to federate a search to other resources may be controlled by user preferences.

In accordance with yet another aspect of the present invention, once the most relevant resources have been determined, the system and method unify the search for occurrences of the search term across disparate resources using normalization. Normalization insures that a unified search will produce meaningful results by determining the relative importance of the search term appearing, for example, in the title of a Web page versus the subject heading of an e-mail. Determining the relative importance of the search term appearing in one location versus another includes first determining in which location to search for each relevant resource, and then determining how to weigh the occurrence of the search term in one location versus its occurrence in the other.

In accordance with a further aspect of the present invention, the search is performed using a local index that is built over time to index resources determined to be relevant to the user's searches. Once indexed, any changes to the indexed resources are reflected in the index for future searches.

In accordance with still further aspects of the present invention, once the unified search has been performed, the system and method provide for blending the search results and presenting the blended results to the user in an integrated manner. Blending the search results includes, among others, determining which results from which resources to display and in what order. Presenting the blended results to the user in an integrated manner includes, among others, displaying disparate results in a readily accessible format that allows the user to quickly identify the particular data for which he or she was searching, regardless of the type of data that the results represent.

In accordance with yet other aspects of the present invention, a computer-accessible medium for a unified search is provided. The computer-accessible medium comprises data structures and computer-executable components comprising a unified search processor for facilitating a unified search of disparate resources and blending the most relevant results from the search for presentation to the user in an integrated manner. The data structures define resources, user preferences, navigational context data, automated relevance data, and index data in a manner that is generally consistent with the above-described method. Likewise, the computer-executable components are capable of performing actions generally consistent with the above-described method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following discussion is intended to provide a brief, general description of a computing system suitable for implementing various features of an embodiment of the invention. While the computing system will be described in the general context of a personal and server computer, or other types of computing devices usable in a distributed computing environment where complementary tasks are performed by remote computing devices linked together through a communication network, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices, including laptop computers, tablet computers, personal digital assistants (PDAs), cellular telephones, and other devices upon which computer software or other digital content is installed.

While aspects of the invention may be described in terms of programs or processes executed by a Web browser in conjunction with a personal computer or programs or processes executed by a search engine in conjunction with a server computer, those skilled in the art will recognize that those aspects also may be implemented in combination with other program modules. Generally, program modules include routines, subroutines, programs, processes, components, data structures, functions, interfaces, objects, etc., which perform particular tasks or implement particular abstract data types.

Figure 1:
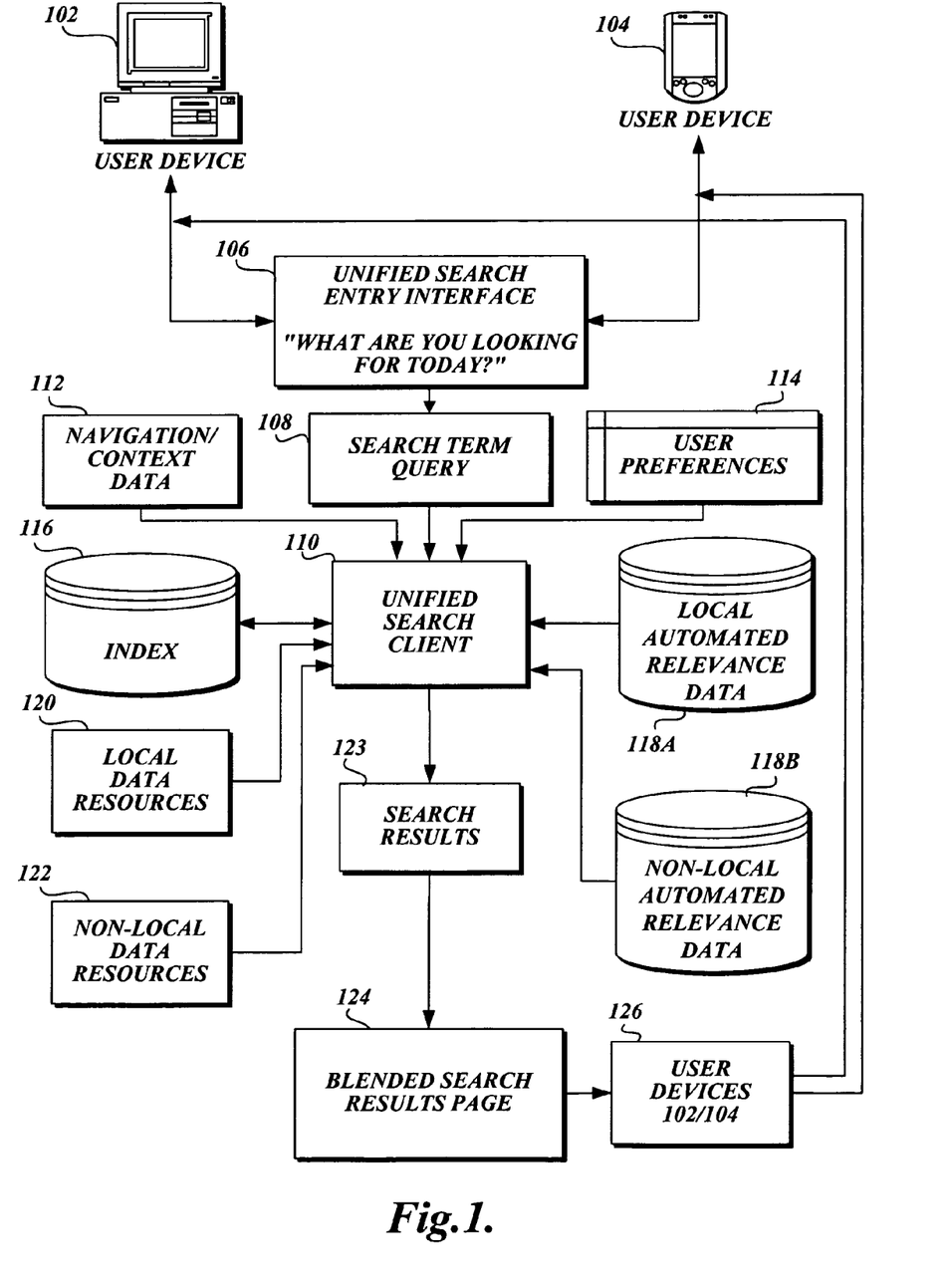
FIG. 1 is a depiction of an exemplary unified search system and one suitable operating environment in which a unified search may be conducted and search results presented, in accordance with the present invention.

FIG. 1 is a depiction of an exemplary unified search system 100 and one suitable operating environment in which a unified search may be conducted, and the search results blended, in accordance with an embodiment of the present invention. As shown, the operating environment includes a unified search client 110 that may reside in a user device, such as a computer system 102 or a personal digital assistant (PDA) 104. The unified search client 110 is generally responsible for providing front-end search services and communicating with remote servers, as needed. The front-end services provided by the unified search client 110 may include, among other services, generating text and/or graphics to receive search term queries 108 entered by users in a unified search entry interface 106 and to present search results 123 in a blended search results page 124 using hypertext transfer protocols in response to information and search queries originating in applications running on user devices 102, 104. The back-end searching services provided by the unified search client 110 may include, among other services, conducting a unified search across disparate resources, blending the search results for presentation on the user devices 102, 104, capturing automated relevance data 118, and updating a local search index 116.

Figure 2:
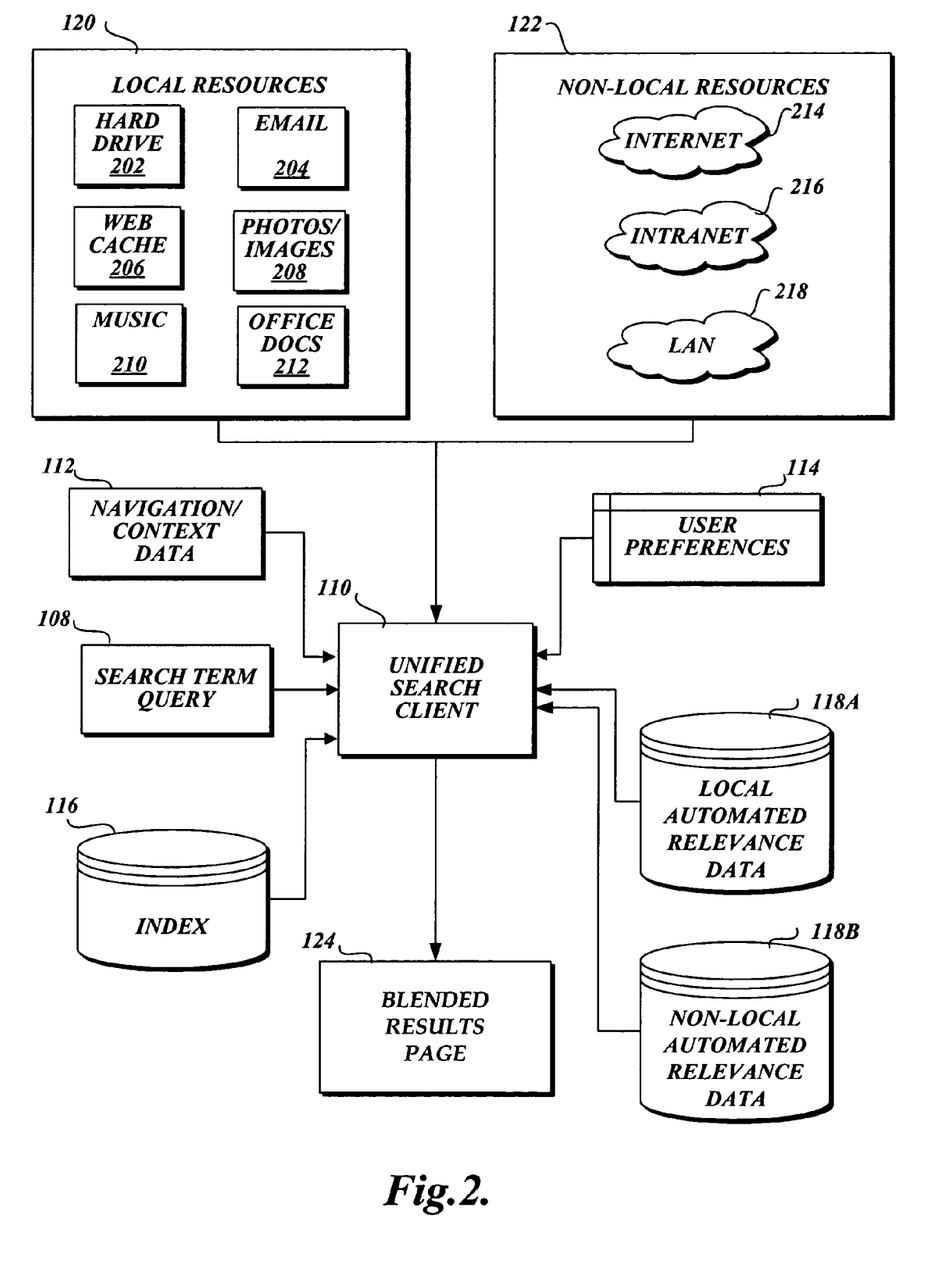
FIG. 2 is a block diagram depicting in further detail an arrangement of certain components of the unified search system of FIG. 1, in accordance with an embodiment of the present invention.

In the environment shown in FIG. 1, the unified search client 110 generates a unified search entry interface 106 in response to a search request entered by a user, and into which the user may input search terms 108 to initiate a search for relevant content in local data resources 120 residing locally on the user device, or on non-local data resources 122. In one embodiment, the unified search entry interface 106 may be implemented as a search box embedded in an application such as a browser application, a word processing program, or a task bar in a graphical user interface such as Windows. In another embodiment, the unified search entry interface 106 may be formed into a separate application window or a page in a browser application. As shown in FIG. 2, the local resources 120 may include data stored on a user device hard drive 202, including e-mail 204, a Web cache 206, photos and images 208, music, and office documents 212, such as word processing documents, spread sheets, etc. The non-local resources may include resources that reside remotely on devices with which the unified search client 110 may communicate, such as over the Internet 214, an Intranet 216, a virtual private network configured over the Internet 214 or Intranet 216, and a local area network 218.

In one embodiment, the unified search client 110 captures the navigational context 112 of the search request, i.e., where the user was at the point that he or she requested the search, and uses that context 112 in conjunction with the search term 108 and any previously stored user preferences 114 to determine the best resources 120, 122 in which to search for content that is relevant to the search term 108. For example, when the user enters the unified search entry interface 106 from an e-mail application, the unified search client 110 may determine that local resources 120 that contain e-mail documents or documents received as attachments to e-mails are likely to be the most relevant resources in which to conduct the search In one embodiment, when determining which resources 120, 122 may be the most relevant resources in which to conduct the search, the unified search client 110 also takes into consideration any available data representing automated measurements of relevance 118. In one embodiment, automated relevance data 118 is metrics that quantify the interaction between a user and the resource in question, including the frequency with which the user has accessed the resource, the length of time and/or the number and significance of the interactions, such as opening or otherwise activating a file, browsing a Web page, editing a document, sending an e-mail, attaching a document to an e-mail, moving a document, etc. The unified search client 110 uses the data 118 to measure the potential relevance of a particular resource under consideration. For example, the greater the frequency of access, the longer the duration of time, and/or the greater the number and/or significance of interactions, then the greater the likelihood that the resource, and the content which the resource contains, will be relevant to the user's search. Whereas conventional methods of determining relevance search the resource's content (or an index representing the content) to determine the frequency with which the search term 108 appears, automated relevance data 118 is usage data that can be captured over time to provide the unified search client 110 with quantifiable information that indicates, albeit indirectly, whether a resource is potentially relevant before searching the resource's content. When combined with the more conventional methods of determining relevance, the unified search client 110 is able to use automated relevance data 118 to advantageously increase the efficiency of the search, since only those resources that are likely to contain relevant content are searched.

In one embodiment, the automated relevance data 118 may be either user-specific or aggregated to reflect the resource's relevance to a particular group of users, or to users in general. For example, the data may indicate the relevance of a particular database to users in a department within a corporation, or the relevance of a Web page to Internet users. The user-specific automated relevance data 118A is generally local data that is captured over time by the search client 112 for local data resources 120, whereas the aggregated relevance data 118B is generally non-local data captured over time by a search server for non-local data resources 122. The automated relevance data 118 is either transmitted to or accessed by the unified search client 110 as needed to determine the potential relevance of a resource 120, 122.

Once the relevant resources are identified, the unified search client 110 initiates the search using index 116 to produce search results 123. The index 116 may be any type of updateable search index used to facilitate rapid searching. Suitable implementations for the index 116 are known or commercially available, and are readily implemented by persons having ordinary skill in the art, particularly in light of this disclosure. In one embodiment, the index 116 may use filters, provided as plug-ins, to index certain types of third party documents, such as a portable document files (PDFs).

In one embodiment, the unified search client 110 takes the disparate nature of the resources 120, 122 into account using normalization. Normalization includes determining the relative importance of finding a search term (referred to as "a hit") in one location in one resource versus another location in another resource, by first identifying in which location in resource 120, 122 to search, and then weighing results from one location more or less than results from another in accordance with the relative importance. The relative importance of a location may vary from search to search, depending on any number of factors including, among others, the navigation context 112, the user's preferences 114, or the search term query itself 108. For example, the relative importance of search term hits in the subject heading of an e-mail may be greater than a hit in the title of a multimedia file when the navigation context data 112 indicates that the user entered the search from an e-mail application.

In one embodiment, once the search is completed, the unified search client 110 blends the search results 123 into a blended search results page 124 that is displayed on the user devices 102, 104. Since the search results 123 may have been found in disparate resources 120, 122, the results themselves may represent disparate types of data. For example, as will be illustrated further with reference to the example search illustrated in FIGS. 5-7, a search for the search term "Madonna" may result in variety of content found in news and fan Web sites, music files, and e-mails. The unified search client 110 determines which of these various results are the most relevant to the user and displays them accordingly. At the same time, the unified search client 110 blends the results in an integrated display that makes it easy to identify one result from another using graphics, positioning, or any other display formatting technique to facilitate user selection from the results. For example, in one embodiment, e-mails, and Web sites may be grouped in separate locations, but the subject headings of e-mails may be positioned and formatted similarly to the headlines of news Web sites, titles of music files, and Web addresses of fan Web sites, to allow the user to easily compare the various results and select the desired result accordingly.

With reference to FIGS. 1 and 2, the user devices 102, 104 communicate with remote devices or resources via one or more computer networks, such as the Internet 214. Protocols and components for communicating via the Internet are well known to those of ordinary skill in the art of computer network communications. Communication between user devices 102, 104 may also be enabled by local wired or wireless computer network connections. The unified search client 110 depicted in FIG. 1 may also operate in user devices 102, 104 that are part of a distributed computing environment, which can comprise several computer systems that are interconnected via communication links, e.g., using one or more computer networks or direct connections. However, it will be appreciated by those of ordinary skill in the art that the unified search client 110 could equally operate in a computer system having fewer or greater number of components than are illustrated in FIG. 1. Thus, the depiction of the operating environment in FIG. 1 should be taken as exemplary and not limiting to the scope of the claims that follow.

Figure 3:
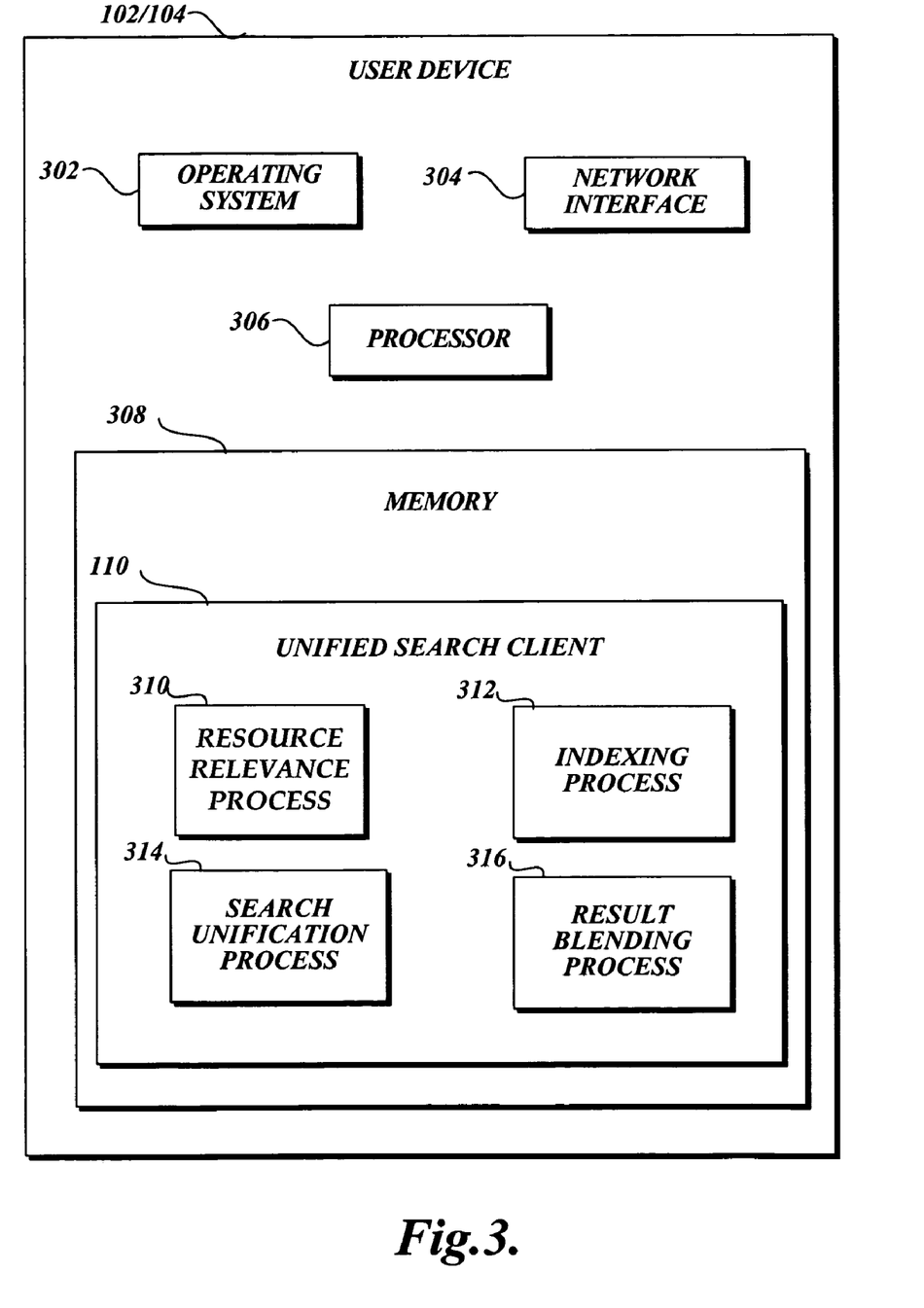
FIG. 3 is a block diagram depicting in further detail an arrangement of certain computing components of the search client for implementing an embodiment of the present invention.

FIG. 3 is a block diagram depicting in further detail an arrangement of certain exemplary computing components of the user devices 102, 104 that host the unified search client 110 and are responsible for the operation of the unified search system 100 shown in FIG. 1. Specifically, the user device 102, 104 is shown, including an operating system 302, processor 306, and memory 308 to implement executable program instructions for the general administration and operation of the client. The user device 102, 104 further includes a network interface 304 to communicate with a network, such as the Internet 214, to respond to search term query 108 and provide search results 123. Suitable implementations for the operating system 302, processor 306, memory 308, and network interface 304 are known or commercially available, and are readily implemented by persons having ordinary skill in the art, particularly in light of this disclosure.

The memory 308 of the user device 102, 104 includes computer executable program instructions comprising the unified search client 110. In some embodiments, the memory 206 may further include various stored data such as the above-described search term query 108 and search results 123, as well as user preferences 114 and navigation/context data 112, as referenced in FIGS. 1 and 2.

In one embodiment, the unified search client 110 includes a resource relevance process 310, an indexing process 312, a search unification process 314, and a result blending process 316. The indexing process 312 may be implemented using known or commercially available indexing technology. The indexing process 312 is invoked whenever a search is conducted or a change to indexed resources occurs.

In one embodiment, the resource relevance process 310 contains logic that, when executed, will monitor and capture the user activity vis-a-vis the resources 120, 122, and record the activity in the form of a metric in automated relevance data 118. For example, the process 310 will monitor a particular document on a hard drive and record the frequency and duration that the document is accessed by the user. In addition, the process 310 monitors and captures the navigation context data 112 leading up the point of displaying the unified search entry interface 106 in response to a search term query 108. The resource relevance process 310 further contains logic to determine the best resources to search based not only on the search term query 108 and the automated relevance data 118 captured thus far, but also on the navigation/context data 112 and user preferences 114.

In one embodiment, the search unification process 314 contains logic that, when executed, will determine the best data within each of the resources that have been determined to be relevant to the search using a process referred to as normalization. For example, the best data to search within an e-mail repository might be the subject heading data as opposed to the body data, whereas the best data to search within a Word document might be the title of the document, or if there is no discernable title, then the file name. Normalization increases the relevance of the search results and insures that the results can be meaningfully compared to determine which are most relevant.

In one embodiment, the result blending process 316 contains logic that when executed will blend the search results, taking into account the disparate nature of the results when one result is from one type of resource 120, 122 and another result is from a different type of resource, e.g., an e-mail versus a spreadsheet document. The process 316 will further present the blended results to the user in an integrated manner that facilitates the user's selection of the desired result. For example, the process 316 may group the presentation of the most relevant results within each resource in the first Web page so that the user may see all of the best results across all categories of grouped results at a glance. As another example, the process 316 may interleave the most relevant results and designate the category to which the result belongs with an appropriate icon or other graphic. Either way, the process 316 will further blend the results and display them in an integrated manner by formatting the results across all categories so that it is easy to compare the hits from one category or group with another. For example, the results in the e-mail category may be vertically aligned with the results in the Web site category so that the e-mail subject headings and Web site titles are in comparable locations within each category.

Figure 4A:
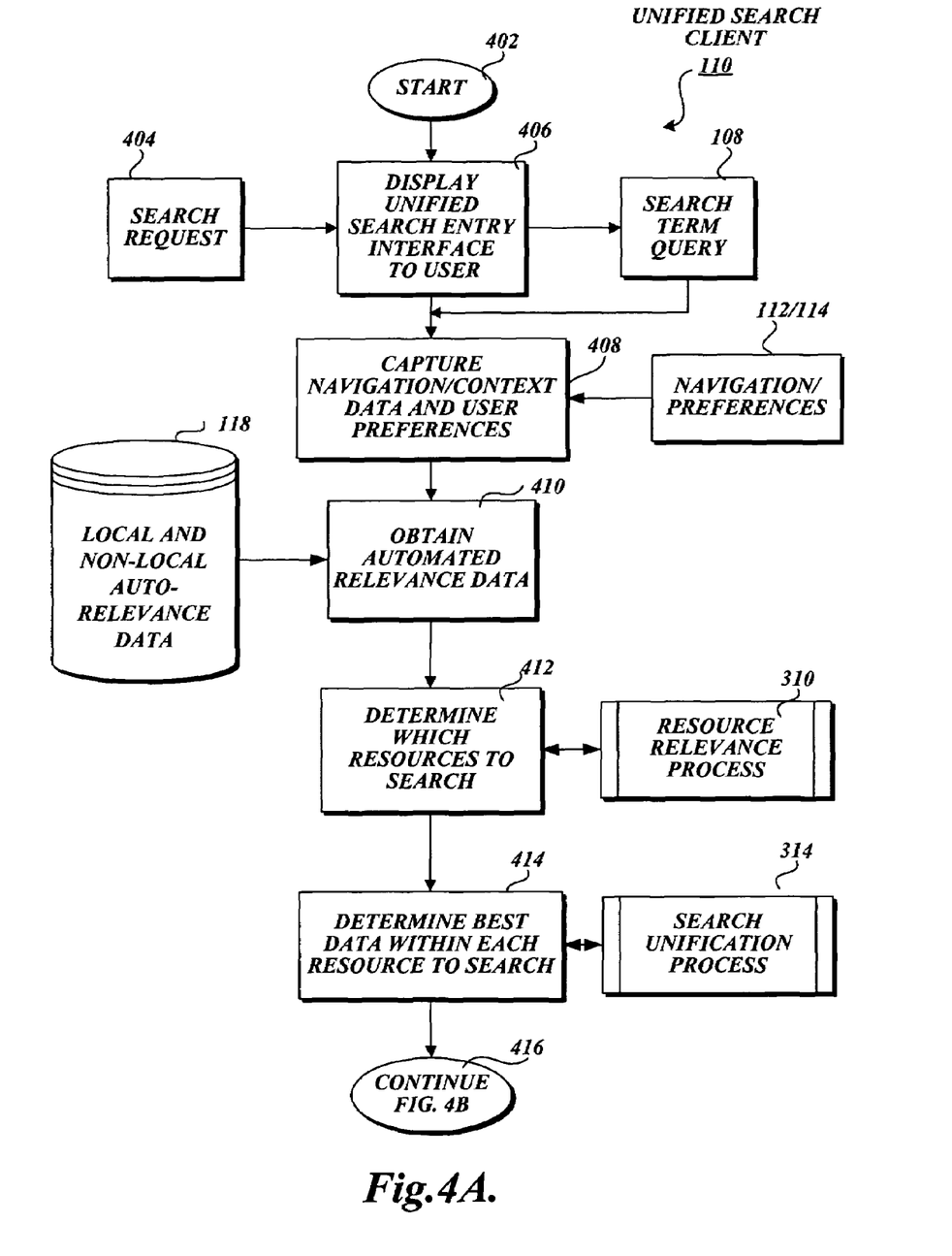
FIGS. 4A-4B are flow diagrams illustrating the logic performed in conjunction with the unified search system of FIGS. 1 and 2 for conducting a unified search and presenting the search results in an integrated manner, in accordance with an embodiment of the present invention.
Figure 4B:
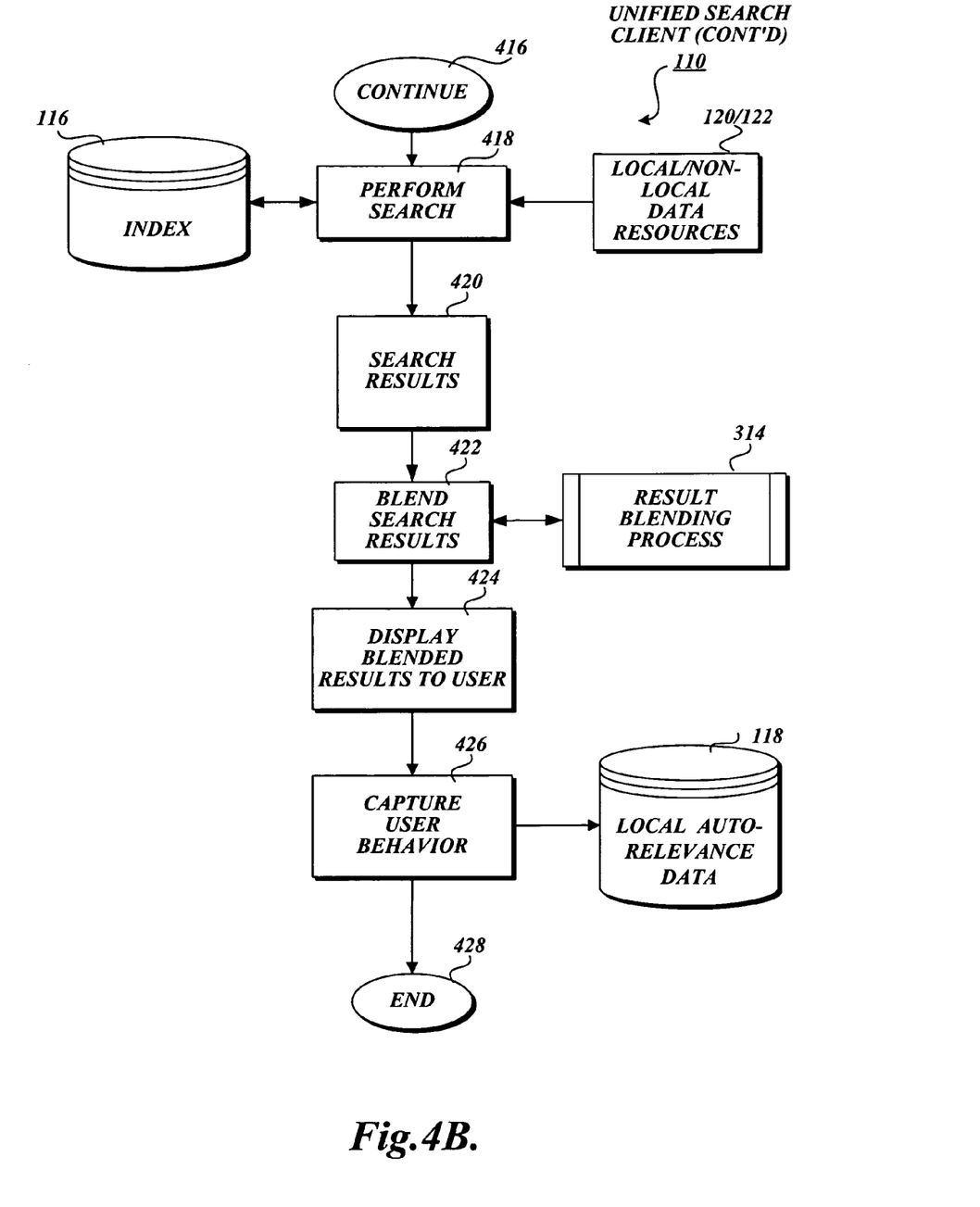

FIGS. 4A-4B are flow diagrams illustrating the logic performed in conjunction with the unified search client 110 of FIGS. 1 and 2 for conducting a unified and blended search in accordance with an embodiment of the present invention. Beginning with the start oval 402, the unified search client 110 receives a notification of a search request 404 originating in an application running on the host device 102, 104. In one embodiment, the request 404 may be intercepted at process block 406 by the client 110, whereupon the client 110 initiates a display of a unified search entry graphical user interface 106 to the user, for example, in the form of a Web page displayed in a browser program. The unified search entry interface prompts the user to enter his or her search term query 108. Meanwhile, the client 110 captures the context of the search that it is about to conduct by storing the navigation leading up to the search request 404, e.g., the application that the user was using at the point that he or she requested the search. In addition, the client 110 captures any user preferences explicitly entered by the user in the unified search entry interface that add to or override and previously entered search preferences. Such preferences may include, among others, designations of resources 120, 122 that are not to be searched, regardless of their relevance to the current search term query 108, or conversely, designations of resources that are to be searched, even when their determined relevance to the query appears doubtful. Other preferences may include privacy or security preferences to prevent logging or otherwise maintain the privacy of searches. In one embodiment, the user's search preferences are determined implicitly from a user's past behavior when using the search feature on his or her user device.

At processing block 410, the client 110 obtains the automated relevance data 118, either from a local source 118A or a non-local source 118B, or from both. The automated relevance data 118 is data that was captured in previous iterations of the unified search client 110 and reflects a history of user interaction with various resources 120, 122 and previous search results 123. At processing block 412, the client 110 invokes the resource relevance process 310, as already described with reference to FIG. 3, to use the available automated relevance data 118 to determine the best resources 120, 122 in which to search for the current search term query 108.

At processing block 414, the client 110 continues processing to determine the best data within each resource 120, 122. The client 110 invokes the search unification process 314, as already described with reference to FIG. 3, to normalize the relevant resources as part of the determination of the best data to search and to conduct the search for occurrences of the search term 108 in the best data accordingly. For instance, in the example already mentioned, if the best resources in which to search for the search term "Madonna" are determined to include e-mail resources 204 and music resources 210, then, after normalizing those resources, the best data in which to search for "Madonna" in the e-mail resource may be the subject heading, whereas the best data in the music file may be the title or file name.

With reference to FIG. 4B, the client 110 continues at oval 416 with process block 418 to perform the search against the best data in the best resources, as determined above. In one embodiment, to maximize the efficiency of the search and minimize the impact on the operation of the user device 102, 104, the search is performed against an index 116 of the searchable resources 120, 122.

The client 110 generates the search results at process block 420 and proceeds at processing block 422 to blend those search results by invoking the result blending process 314, as described with reference to FIG. 3. The process 314 of blending the results includes determining which results from which resources to display, given the limited display area that is available on the search results Web page, and formatting the results for presentation to the user in an integrated manner to facilitate the user's selection of the desired result. At processing block 424, the client displays the blended and formatted results to the user. An example of blending search results is described in further detail below with reference to FIGS. 5-7.

In one embodiment, once the blended search results are displayed to the user, then the client 110 at processing block 426 invokes the resource relevance process 310 to monitor and capture the user interaction with the blended search results in preparation for recording local automated relevance data 118A that will enable the client 110 to further refine the determination of resource relevance when conducting future searches, and after which the logic of client 110 ends at termination oval 428.

Figure 5:
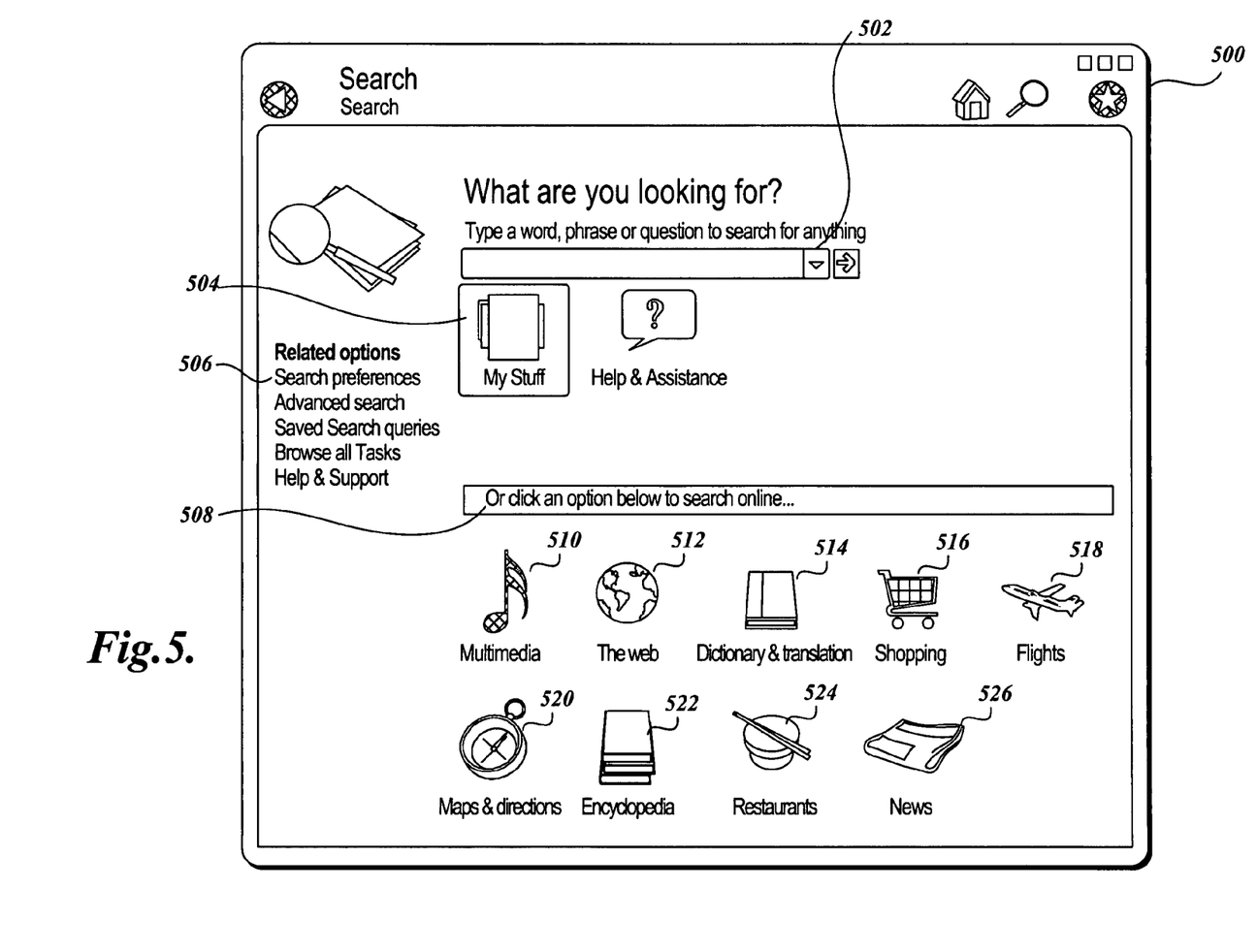
FIG. 5 is a pictorial diagram of an exemplary unified search user interface for implementing an embodiment of the present invention.
Figure 6:
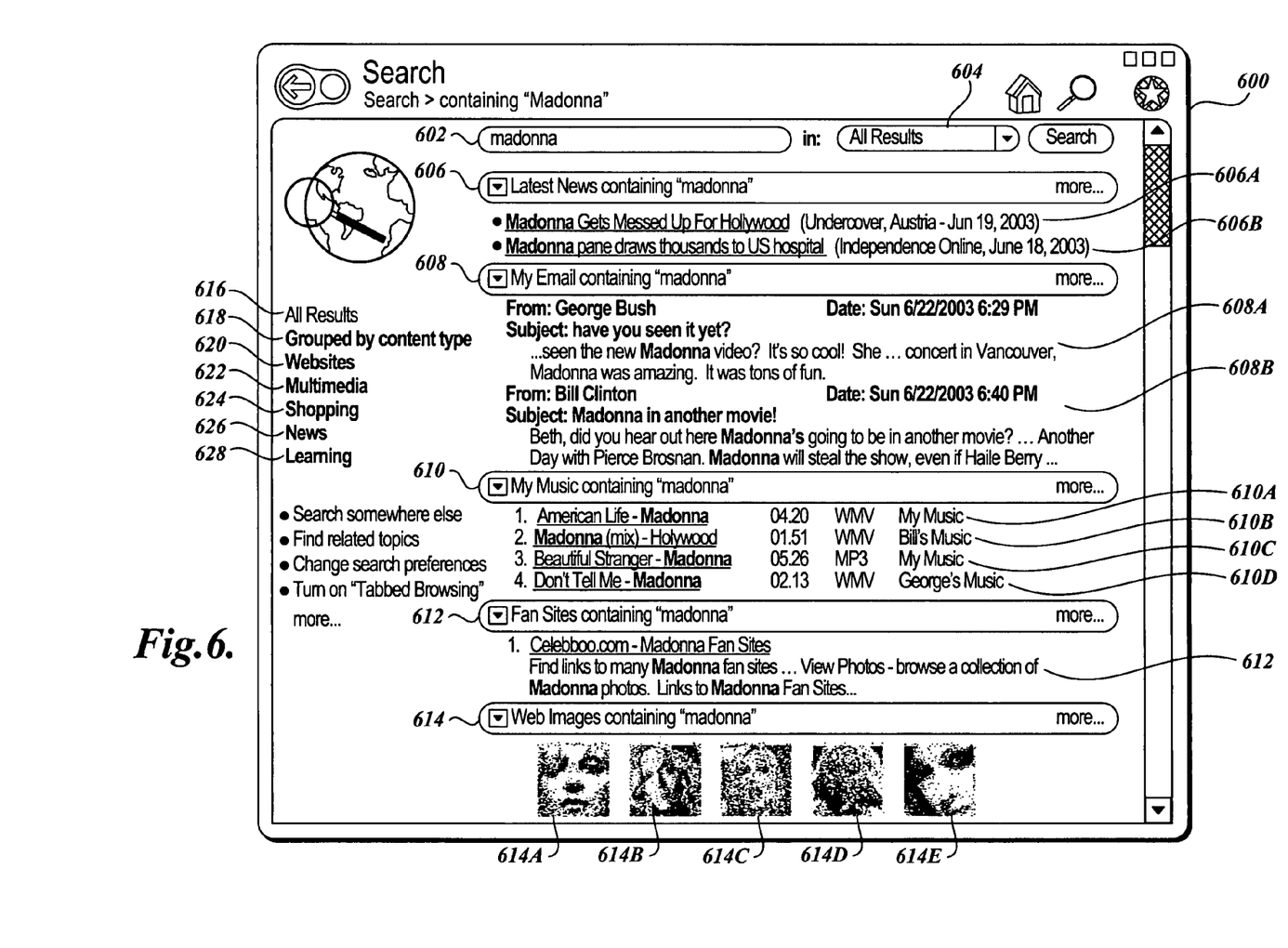
FIG. 6 is a pictorial diagram of the exemplary unified search user interface of FIG. 5 at a later time, after the search results have been blended and presented to the user in an integrated manner in accordance with an embodiment of the present invention.
Figure 7:
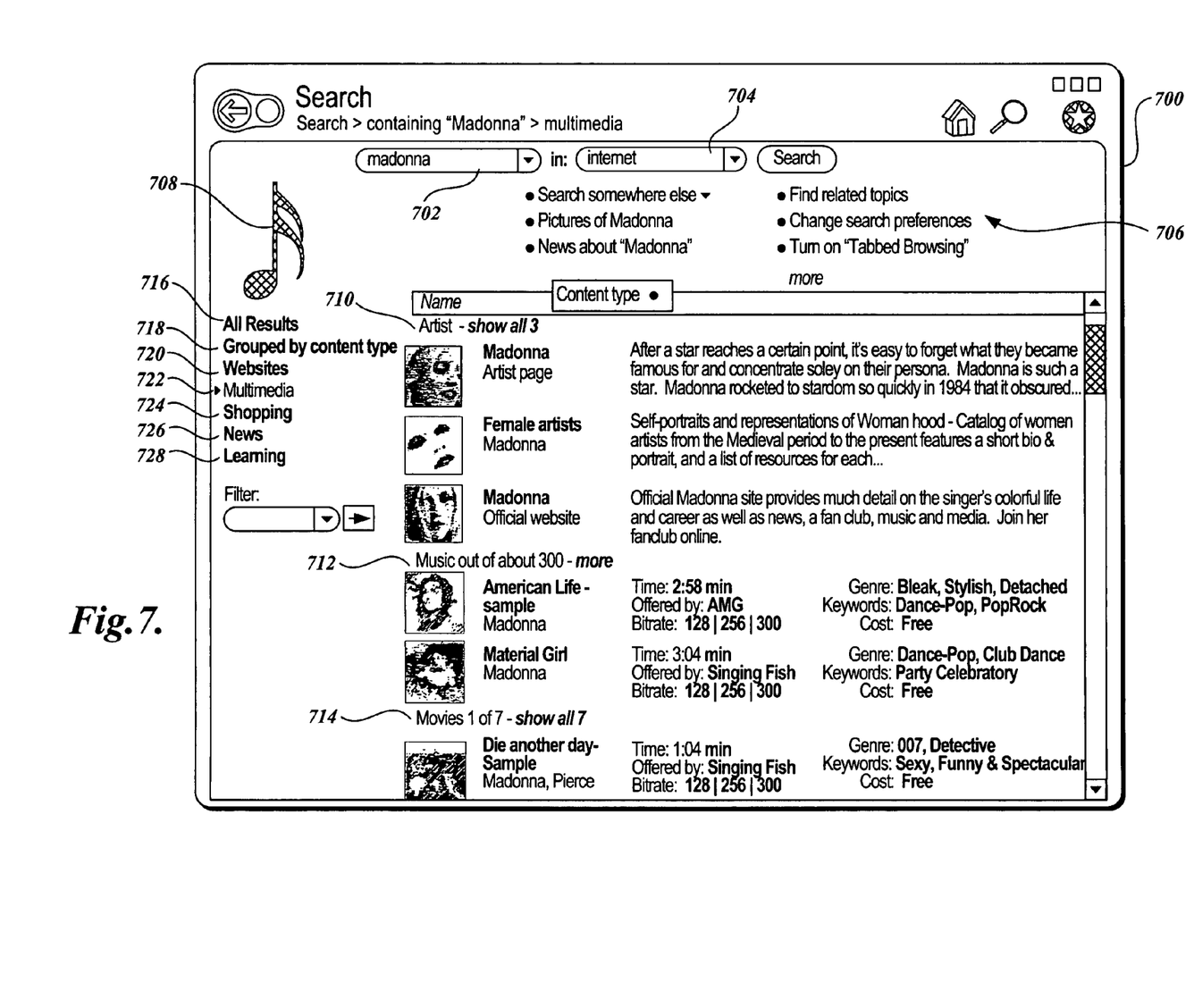
FIG. 7 is a pictorial diagram of the exemplary unified search user interface of FIG. 6, after an option to display the multimedia search results has been selected in accordance with an embodiment of the present invention.

FIGS. 5-7 illustrate a browser program 500 displaying a unified search entry interface 106 implemented in a Web page, as previously described with reference to FIG. 1, and in which the user is able to enter one or more search terms in a search entry box 502. The unified search entry interface 106 may be generated by the unified search client 110 or may be generated remotely and delivered to the client 110 on the user's computing device 102, 104 via the Internet. The user enters the desired search terms in the box 502 and uses a pointing device, keyboard, or other input device to initiate the search, e.g., by clicking on the arrow button identified at reference numeral 502. In one embodiment, the user may be presented with a number of search preferences 506 to select to customize his or her searching. For example, the search may be limited to certain local resources by clicking on the "My Stuff" folder 504. The user may also be prompted to select options that will cause the search to be federated out to other online resources 508, such as a multimedia resource 510, the Internet 512, a dictionary 514, a shopping resource 516, an airline flight resource 518, a map resource 520, an encyclopedia resource 522, a resource for restaurant dining 524, and a news resource 526. Some of the options may be selected by default or may be selected based on previously designated user search preferences 506.

In the illustrated example in FIG. 5, the user has entered the search term "MADONNA." The results of the unified and blended search, as carried out by the client 110 in accordance with an embodiment of the present invention, are displayed to the user, as illustrated in FIG. 6. The search term "MADONNA" is displayed in text box at reference numeral 602. The option for display all of the results is selected in pull-down box at reference numeral 604. As shown, the display lists five different categories on the page with more on subsequent pages, since the option in the sidebar at reference numeral 606 is selected for displaying "All Results" for "MADONNA." The unselected options include the "Grouped by Content Type" option at reference numeral 618, the "Web sites" option at reference numeral 620, the "Multimedia" option at reference numeral 622, the "Shopping" option at reference numeral 624, the "News" option at reference numeral 626, and the "Learning" option at reference numeral 628. In the illustrated example, additional interface options for alternate search options appear at reference numerals 630, 632, 634, and 636.

The first five category headers for the selected "All Results" option, for news Web sites at reference numeral 606, e-mail at reference numeral 608, music at reference numeral 610, fan Web sites at reference numeral 612, and images at reference numeral 614, are displayed on the first page, each with the best results listed below the heading for that category. For example, in the news Web sites category at reference numeral 606, the best result is a news item 606A about remixing a Madonna single, while in the e-mail category at reference numeral 608, the best result is an e-mail 608A inquiring about a Madonna video. Similarly, in the categories for fan sites 612 and images 614, each has the best results displayed directly beneath the category header. In each case the normalized data from the result is displayed as homogeneously as possible—in this instance, in the leftmost position—so that the results in each category are comparably aligned (with the exception of the Web images category at reference numeral 614, where the images themselves are displayed horizontally). The comparable alignment of the best results in conjunction with separating the results out by category headers advantageously facilitates the user's selection of the desired result.

In an alternate display, the results of the unified and blended search, as carried out by the client 110 in accordance with an embodiment of the present invention, are displayed to the user as illustrated in FIG. 7. Again, the search term "MADONNA" is displayed in text box at reference numeral 702, and the search is restricted to occurrences of "MADONNA" in the Internet, as indicated in text box at reference numeral 704. As shown, the alternate display lists 342 results in the artists, music, movies, radio, and events categories, since the option in the sidebar at reference numeral 722 is selected for displaying just the multimedia results for "MADONNA." The unselected options include the "All Results" option at reference numeral 716, the "Grouped by Content Type" option at reference numeral 718, the "Web sites" option at reference numeral 718, the "Shopping" option at reference numeral 724, the "News" option at reference numeral 726, and the "Learning" option at reference numeral 728. Additional options to change the display or to change the search are shown at the top of the page at reference numeral 706. Three category headers—for artist Web sites at reference numeral 710, music at reference numeral 712, and movies at reference numeral 714—are displayed similarly to the categories in FIG. 6, with the best results listed below the heading for that category. For example, in the artist Web sites category at reference numeral 710, the best result is a Madonna artist page about Madonna, while in the music category at reference numeral 712, the best result is a music sample of "American Life," a recent Madonna song, and in the movie category at reference numeral 714, the best result is a movie sample from the move "Die Another Day." As before, each of the displayed categories 710, 712, and 714, has the best results displayed directly beneath the category header. In each case, the normalized data from the result is displayed as homogeneously as possible—in this instance, in the top and leftmost position—so that the results in each category are comparably aligned.

While the presently preferred embodiments of the invention have been illustrated and described, it will be appreciated that various changes may be made therein without departing from the spirit and scope of the invention. For example, in one embodiment of the present invention, the various components of the unified search system 100 and, in particular, the functionality of the unified search client 110, as described with reference to the resource relevance process 310, the indexing process 312, the search unification process 314, and the result blending process 316, may be implemented in different combinations of processes or programs and may be distributed across one or more computing devices.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for facilitating a search for content from disparate resources, the method comprising:
   displaying a unified search entry interface in response to a user request to search for content;
   prior to conducting the search, obtaining an automated measurement of relevance for each of a plurality of disparate resources in which to search for occurrences of a search term entered into the unified search entry interface by the user, the automated measurement of relevance being based on quantified user interaction with the disparate resources, quantified user interaction including at least one of the frequency with which the user accesses the resource, the length of time that the user accessed the resource, and what the user did with the resource after access;
   determining relevant resources from the plurality of disparate resources in which to search for occurrences of a search term entered in the unified search entry interface, the determination being based on the automated measure of relevance;
   normalizing the relevant disparate resources; and
   blending disparate results obtained from searching for occurrences of the search term in the normalized relevant disparate resources.

2. The method of claim 1, wherein normalizing the relevant disparate resources comprises:
   determining a relative importance of the search term occurring in one location in a first disparate resource versus the search term occurring in another location in a second disparate resource; and
   weighing the occurrence of the search term in the disparate resources in accordance with the relative importance.

3. The method of claim 2, wherein blending the disparate results includes ranking the results by the weight of the occurrence of the search term, displaying the ranked results by a category associated with the resource, and displaying the locations in which the search terms occurred in comparable positions within each category.

4. The method of claim 1, further comprising:
   capturing a context of the search request; and
   wherein determining at least one relevant resource is also based on the context of the search request.

5. The method of claim 1, wherein the automated measurement of relevance is a metric that quantifies a user interaction with the resource.

6. The method of claim 1, further comprising:
   obtaining a user preference indicating a preferred resource in which to search;
   wherein determining the at least one relevant resource is also based on the preferred resource as indicated in the user preference.

7. The method of claim 1, further comprising:
   building an index for the disparate resources; and
   searching the index associated with the relevant resource when searching for occurrences of the search term.

8. A computer-accessible medium having computer-executable instructions for conducting a unified search for electronic content, the instructions comprising:
   displaying a unified search entry interface in response to a request to search for content;
   prior to conducting the unified search, obtaining an automated measurement of relevance for each of a plurality of disparate resources in which to search for occurrences of a search term entered into the unified search entry interface by the user, the automated measurement of relevance being based on quantified user interaction with the disparate resources, quantified user interaction including at least one of the frequency with which the user accesses the resource, the length of time that the user accessed the resource, and what the user did with the resource after access;
   determining relevant resources from the plurality of disparate resources in which to search for occurrences of a search term entered in the unified search entry interface, the determination being based on the automated measure of relevance;
   normalizing the relevant disparate resources; and
   blending disparate results obtained from searching for occurrences of the search term in the normalized relevant disparate resources.

9. The computer-accessible medium of claim 8, wherein the instruction to normalize the relevant disparate resource comprises:
   determining a relative importance of the search term occurring in one location in a first disparate resource versus the search term occurring in another location in a second disparate resource; and
   weighing the occurrence of the search term in the disparate resources in accordance with the relative importance.

10. The computer-accessible medium of claim 8, wherein the instruction to blend the disparate results includes instructions to rank the results by the weight of the occurrence of the search term, display the ranked results by a category associated with the resource, and display the locations in which the search terms occurred in comparable positions within each category.

11. The computer-accessible medium of claim 8, wherein the instructions further comprise:
   capturing a context of the search request; and
   determining the at least one relevant resource based on the context of the search request.

12. The computer-accessible medium of claim 8, wherein the instructions further comprise:
   obtaining a user preference indicating a preferred resource in which to search; and
   determining the at least one relevant resource based on the preferred resource, as indicated in the user preference.

* * * * *